Aug. 30, 1960     G. ZIEHER     2,950,797
CLUTCH TEETH
Filed April 24, 1956     2 Sheets-Sheet 1
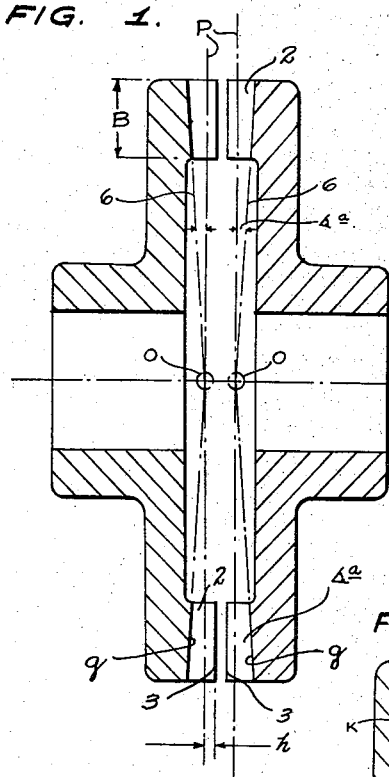
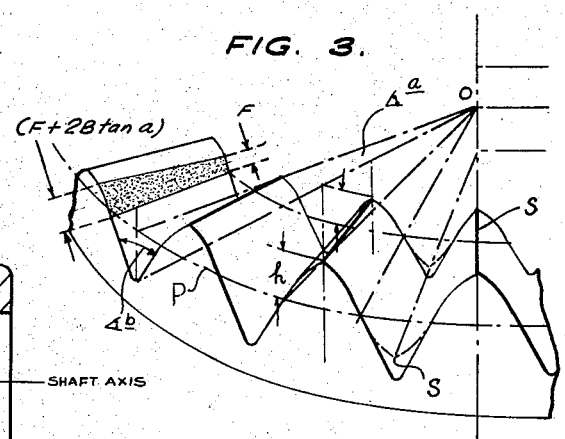
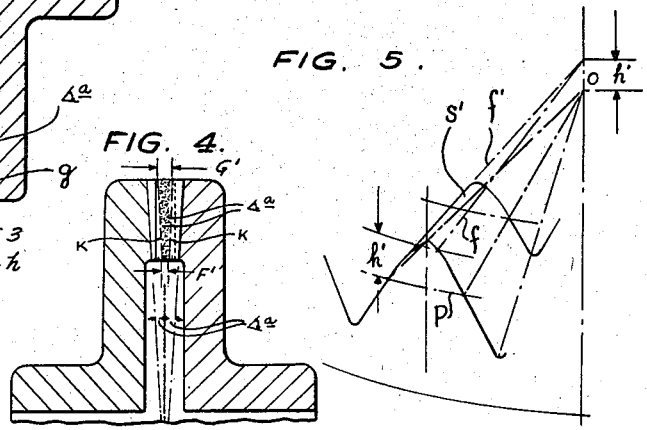
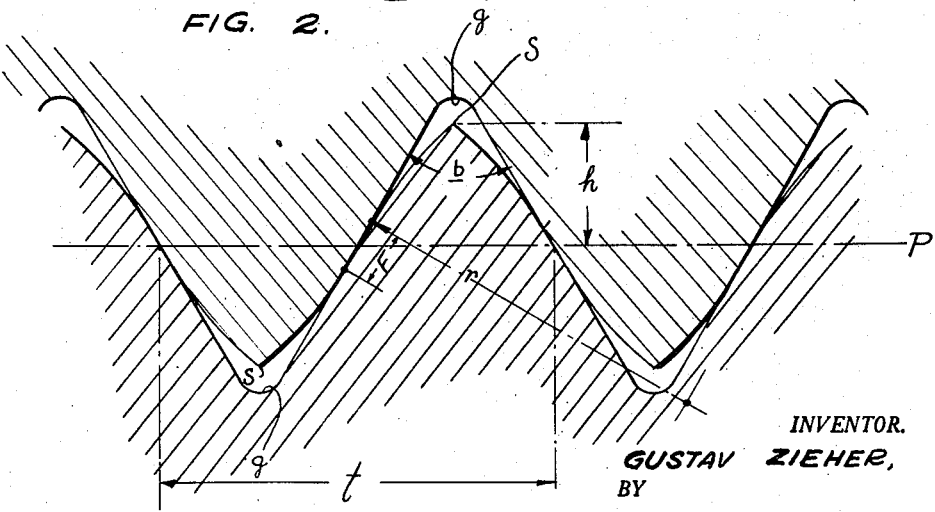
INVENTOR.
GUSTAV ZIEHER,
BY
ATTORNEYS.

Aug. 30, 1960    G. ZIEHER    2,950,797
CLUTCH TEETH
Filed April 24, 1956    2 Sheets-Sheet 2

INVENTOR
GUSTAV ZIEHER

BY
OSTROLENK, FABER, GERB & SOFFEN
ATTORNEYS

United States Patent Office 2,950,797
Patented Aug. 30, 1960

2,950,797

CLUTCH TEETH

Gustav Zieher, Friedrichshafen, Germany, assignor to I-T-E Circuit Breaker Company, Philadelphia, Pa., a corporation of Pennsylvania Filed Apr. 24, 1956, Ser. No. 580,329

1 Claim. (Cl. 192—108)

This invention relates to clutch teeth particularly for use in positive drive clutches of a type which undergo frequent engagement and disengagement.

The use of wedge-shaped surfaces in positive driving clutch teeth has heretofore been known where the flanks of the teeth run radially toward the axis of the shaft and the crests of the teeth and bottom lands thereof are located on cones whose axes coincide with those of the clutch shaft. Thus, two identical clutch rings having wedge-shaped teeth are brought into mesh with the surfaces of the flanks fitting flush one on the other. Such a type of clutch is intended for stationary shaft couplings and for transmission of high coupling torques. However, in the case of certain types of clutches in various machines or apparatus very frequent engagement and disengagement under load is met. As the crests of two meshing teeth of conventional form are not parallel to each other point contact is effected at the first moment of engagement and, as a result, considerable shocks and fractures of the teeth occur.

Accordingly, it is the object of the present invention to provide a clutch of the positive drive type wherein the teeth are shaped so as to minimize shocks and the wear of engaging and disengaging.

Generally, it is desirable that during the whole process of engagement or disengagement line contact exists between the meshing tooth flanks. This is accomplished when the tooth flanks are helicoids. Such clutch teeth with helicoid flanks are known, but their manufacture is difficult.

The present invention provides a clutch tooth form which is easily manufactured and the flanks of which have at the same time flat or line contact or approximate line contact at the beginning and at the end of engagement.

In keeping with the above objects, there is provided a clutch ring having teeth of a profile which combines certain curved areas with a flat area for final engagement. Specifically, the curved portions of the profile are circular, thus making for economic manufacture while at the same time effecting an easing of the teeth into mesh which minimizes wear. Further, the crests of the teeth are in a plane normal to the axis of the clutch shaft, which prevents canting upon initial engagement.

In a special form of the invention the longitudinal profile of the teeth may be crowned so that a pair of crowned teeth mesh with a contact which is heaviest at the central portion of the teeth and fades out towards the ends of meshing teeth. For ease of manufacture the clutch tooth may have an arcuate longitudinal center line, which enables manufacturing of the teeth by a generating process.

When cutting the clutch rings by a continuous indexing and generating process, for example, crowning of the tooth flanks may be realized by composing them of a series of cycloidal curves having different transient centers.

A description of the invention now follows in conjunction with the appended drawing, in which:

Fig. 1 shows an elevation in section of two clutch rings prior to engagement.

Fig. 2 is a magnified section through a portion of a pair of engaged clutch rings.

Fig. 3 is a perspective view showing the tooth arrangement and relationships.

Fig. 4 is a section through a pair of engaged teeth illustrating the area of contact engagement, and Fig. 5 is a modification of the tooth shape or profile.

Figure 6:
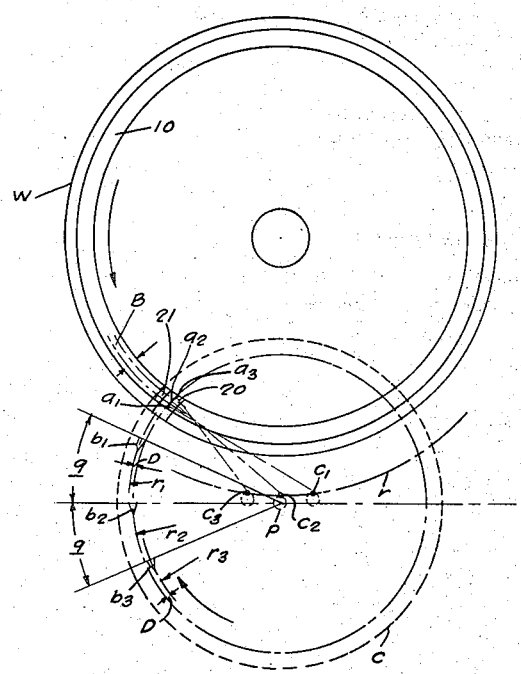
Fig. 6 is a schematic view of a device for manufacturing crowned teeth.

Referring now to Figs. 1 through 4, wherein like reference characters are used to indicate identical parts, a pair of clutch rings are disclosed, each being provided with a plurality of radial teeth 2 having leading edges 3. The bottom land g of the teeth coincides with cones indicated by the dot-dash lines 6, such cones having an apex angle of twice the angle $a$ as shown on Fig. 1. The angle $a$ is the angle existing between the plane of the pitch circle P and bottom lands. The apices of the cones are at the points O which will be understood to be on the clutch shaft axis. These apices meet and coincide with the centers of the pitch circles P when the clutch rings are fully engaged. Full engagement of the teeth is illustrated in Fig. 2.

The height of the tooth above the pitch circle P is indicated by the reference character $h$ on Fig. 2, while the pitch of the tooth is indicated by the reference character $t$. By referring to Fig. 2, it will be noted that the tooth profile comprises an arc extending from the crest line S which meets tangentially with a straight flank of the tooth profile extending to the land $g$ and forming the angle $b/2$ with the vertical axis. The arcs are of the curvature as determined by the radius $r$ indicated on Fig. 2.

A tooth as described above may be made by profile blades inserted in a milling cutter.

Preferably, for an electromagnetically operated clutch, the teeth being made of magnetic material, a line or ridgelike profile is used so as to eliminate the development of strong magnetic poles. Thus, a flat crest would have a tendency to draw the two clutch rings together so that tooth crests would abut each other and thus prevent engagement.

Referring to Fig. 4, the area of engagement is shown in dot-dash lines and is seen to be trapezoidal in shape and symmetrical with respect to the pitch circle P. The distance F of Figure 2 which is the length of the inner side of the trapezoidal area, when projected on a plane perpendicular to pitch circle P in Figure 2, becomes the distance F' in Figure 4 where the distance $F'=F \cos b/2$. From simple trigonometry, the projected length of the outerside of the trapezoid, or projected length G' (Figure 4) becomes $G'=(F+2B \tan a) \cos b/2$, whereby the actual length of the outerside G, as shown in Figure 3, is, $G=(F+2B \tan a)$. It will be further noted that the long sides of the trapezoid are parallel to the respective lands $g$ of the teeth. Thus, the boundaries of contact as represented by the lines K are parallel to the lands.

During the process of disengagement, the trapezoidal surfaces separate and the areas of flat contact change approximately into a common line of contact on or near the crest of the teeth. When the linear crests of the teeth touch, the teeth are disengaged.

By referring to Fig. 3 it will be noted that the crests $s$ lie in a plane at a distance $h$ from the plane of the pitch circle, $h$ representing the height of the tooth thereabove. The principle of the invention could also be carried out in a formation wherein the crests of the teeth may lie on a conic surface with the crests of the teeth of a cooperating clutch ring lying on a similar conic surface.

The angle between the adjacent straight portions of the flanks between two teeth is considered as the angle $b$ as shown in Fig. 3, and given such angle, along with the value of angle $a$, the radius $r$ of the arcuate portions of the tooth profile can be determined, that the tooth crests of a pair of mating clutch rings are parallel to each other.

The shaded area in Fig. 3 represents the area of contact of two meshing tooth flanks at the time of full engagement. The area of contact is a trapezoid with two parallel sides F and G. F is twice the distance between the pitch circle P and the tangent point T of the curved portion of the tooth flank. Then, G is equal to $F+2B \tan a$, B being the width of the tooth (see Fig. 1).

As shown in Fig. 5, a rounded crest is possible within the scope of the invention. In such cases, the flank of each tooth has a line near the crest thereof parallel to the plane of the pitch circle and intersecting the clutch axis. This line represents the line of contact engagement of two teeth as they approach each other. As seen in Fig. 5, the lines $f$ and $f'$ near the rounded crest $s'$ are at the distance $h'$ from the center O of the pitch circle. Assuming that the tooth as shown in Fig. 5 is of the same overall height as the tooth in Fig. 3, then the distance $h'$ of the tooth shown in Fig. 5 is smaller than the corresponding distance $h$ of the tooth in Fig. 3. It will be understood that two clutch rings having teeth as shown in Fig. 5 will be identical, each having lines $f$ and $f'$ which are the first lines of contact at the beginning of engagement and the last lines of contact at the end of engagement. In view of this, the crest of the tooth as shown in Fig. 5 may be flattened, if desired, up to the lines $f$ and $f'$.

Fig. 6 represents schematically a device for manufacturing longitudinally crowned teeth by a continuously indexing and generating process. As shown in Fig. 6, a cutter disc $c$ is connected to a pinion $p$ meshing with a gear $r$ which is connected to the work plate $w$ supporting the clutch ring 10. The clutch ring 10 has arcuate teeth 20, one flank of which is crowned. Thus, during service, a crowned flank of one clutch ring bears against a straight flank of the coacting clutch ring.

In one embodiment of the invention the crowned flank is composed of three cycloidally curved surfaces $a_1$, $a_2$, and $a_3$, which are successively cut by three blades $b_1$, $b_2$, and $b_3$ inserted in the cutter $c$. The blade $b_1$ cuts the flank portion $a_1$ of the tooth 20, whereby care is to be taken that the blade $b_1$ will not attack the straight flank of the adjacent tooth 21. Blade $b_2$ cuts the central portion $a_2$ of the crowned flank of tooth 20 and the straight flank of tooth 21. Blade $b_3$ cuts the portion $a_3$ of tooth 20, whereby care is to be taken that $b_3$ does not attack the adjacent straight flank of tooth 21. The three surfaces $a_1$, $a_2$, and $a_3$ are inclined to each other owing to the fact that the corresponding cutting movements originate from different transient centers $c_1$, $c_2$, and $c_3$. The blades $b_1$, $b_2$, and $b_3$ are coordinated to radii $r_1$, $r_2$, and $r_3$ inclined to each other by the rolling angle $g$. In the present embodiment of the invention the radii $r_1$, $r_2$, and $r_3$ differ from each other by the same amount D.

Figure 7:
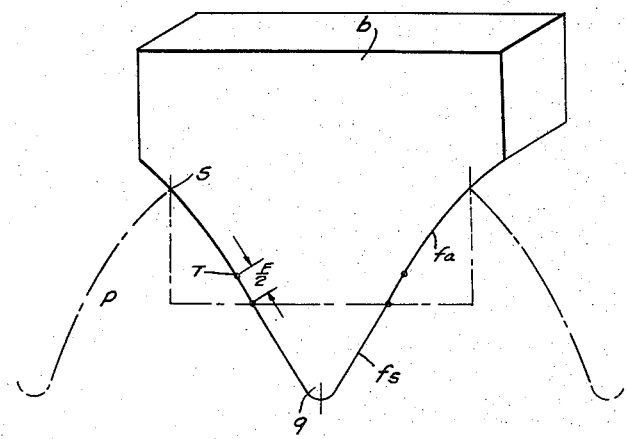
Fig. 7 shows a cutting blade.

Fig. 7 represents one of the cutting blades $b$ with the tooth profile to be cut represented in dot-dash lines. The reference letter $f_a$ signifies the arcuate portion of the tooth flank blending into the straight portion $f_s$ of the tooth flank. The arcuate and the straight portion meet in the tangent point T, lying at a distance $F/2$ from the pitch circle P.

I claim:

A clutch ring for a positively acting clutch; said clutch ring being adapted to cooperate with a cooperating clutch ring of identical construction; said clutch ring having clutch teeth; each of said clutch teeth having radial crests lying in a plane perpendicular to the axis of rotation of said clutch ring; the flanks of said teeth from a point above their pitch circle and extending toward the crests of said teeth following a plane uniform curve; said flanks of said teeth from said point above said pitch circle beginning said uniform curve and extending downwardly being straight; the engagement of each of said teeth of said clutch ring and respective teeth of said cooperating ring of identical construction occurring on a trapezoidally shaped area symmetrically disposed about the pitch circle of said teeth; the marginal edges of said trapezoidally shaped area of engagement extending along said flanks of said teeth from the center of said ring and both above and below the pitch circle of said ring.

References Cited in the file of this patent

UNITED STATES PATENTS

| | | |
|---|---|---|
| 2,384,582 | Wildhaber | Sept. 11, 1945 |
| 2,405,171 | Wildhaber | Aug. 6, 1946 |
| 2,654,456 | Wildhaber | Oct. 6, 1953 |

FOREIGN PATENTS

| | | |
|---|---|---|
| 237,460 | Switzerland | Aug. 16, 1945 |
| 624,769 | Great Britain | June 19, 1949 |